Patented Sept. 1, 1931

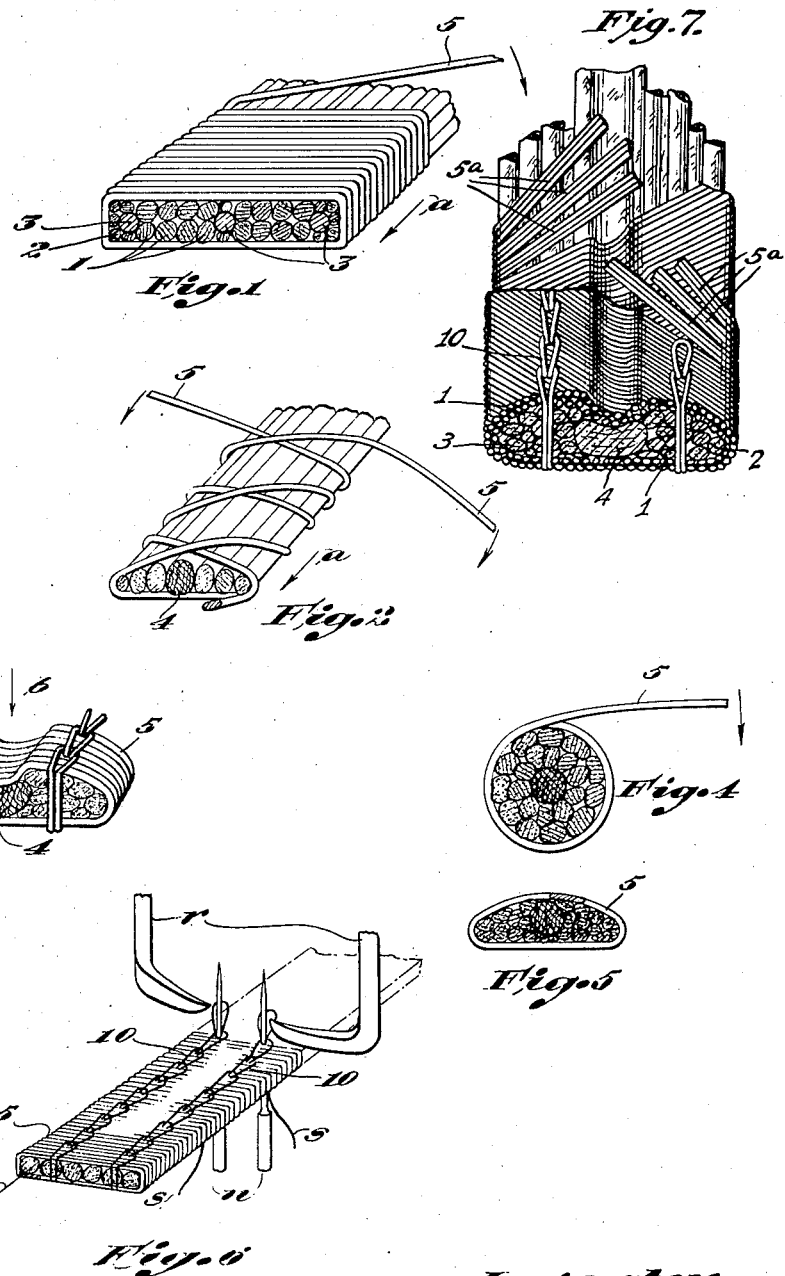

1,820,935

UNITED STATES PATENT OFFICE

HENRY W. BUHLER, OF GLOUCESTER, MASSACHUSETTS

MOLDED TRIMMING

Application filed June 15, 1928. Serial No. 285,641.

This invention relates to a molded trimming, an elongate strand or strip structure suitable for use as an architectural or upholstery element, or as a core giving form to an encasing tubulature, or fitting a slotted trimming, respectively providing a decorative ultimate surface or a seat for the elongate strand or strip of this invention.

The motor-car body, railway and other passenger vehicle, building, and the house and furniture building industries find increasing need for strip-form molded trimmings, both for exterior and for interior use in the bodies of cars or carriages, as well as for such purposes as providing glass-retaining moldings on or stops and packings for window or door closures, providing edge or seam covering trimming for upholstery, and providing surface relief for decoration or rain-water flow directors, for example only, for the exterior surfaces. These industries principally rely for these purposes on cloth or artificial leather or sometimes metal tubulatures, strip pipings, or mounting bases for such molded trimmings now appearing in considerable quantities interiorly or exteriorly of the vehicle body, the interior trim of rooms in houses, or the trim for cabinet work, furniture and other household utilities.

For these uses this invention provides a molded trimming of a reliably constant cross-sectional form, preferably externally covered with a textile fabric, having transverse flexibility to bend about a narrow angle in the direction of its width and in the direction of its thickness, but adapted to resist deformation either of its cross-sectional shape or of its dimensions of width or thickness, and in a preferred form adapted to be nailed in place on the thing of which it is to become a part, either for some functional utility or for decoration. The present invention is not primarily concerned with the exterior covering, or any supporting or confining metallic or other channel in which the molded strip of the invention may be included, one characteristic of the invention being that it provides a shape for a filling or inclusion indifferently applicable to any kind of channel or tubulature relied upon for the exterior surface of the molding or trim, stop or abutment for which the device is used.

The invention will now be explained by description of preferred species only, by way of illustration of the genus or class of such devices constituting the invention.

In the accompanying drawings,

Fig. 1 is a view in perspective illustrating one mode of making a body for a moulding of the kind referred to;

Fig. 2 is a similar view illustrating a modified procedure;

Fig. 3 is a perspective, partly in section, showing one kind of finished form of a moulding of the kind illustrated in Figs. 1 or 2;

Fig. 4 is a section;

Fig. 5 is a similar section after treatment showing a modified form of the structure of Fig. 4;

Fig. 6 is a perspective illustrating a further modification; and

Fig. 7 is a perspective view illustrating the appearance of a moulding comprising oppositely wound binder strands arranged in sets of two or more.

Referring now to Figs. 1 and 2, molded trimmings of the kind referred to are generally used with a cover, for example of a braided or woven textile of natural or artificial leather, and they may be applied to the surface which is to carry them by nailing, by adhesives, or by entering the finished trimming in a channel provided for it. They may serve merely to decorate a surface, or they may be utilized for any of the purposes of a bead or moulding, for examples as a window or door stop, as concealing trimming for upholstery, in the interior of automobile bodies; or as decorative trim on the exterior of automobile or coach bodies. In order to assemble the core trips illustrated with an ultimate covering, not shown, it is necessary that the structures should have a reliable constancy of cross section. One way of attaining this, as more particularly set out in my application for Letters Patent Serial No. 163,078, filed January 24, 1927, and Serial No. 285,640 filed June 15, 1928 concurrently herewith, is to build up a core of longitudinally-extending stuffer elements held together by a casing. As described in my said application for Patent Serial No. 285,640, one preferred way to provide a casing surrounding the stuffers is to braid the casing. But in some instances for increased adaptability and flexibility the elements of the core may be fasciated together in other ways. The present invention is concerned with a mode of concatenating or holding together an aggregate of stuffing strands in such a way as to obtain a maximum transverse flexibility without distortion of form.

Referring now to Fig. 1, a preferred mode of manufacture is to assemble an aggregate of stuffer strands 1, most of which may be hard paper yarns formed from strips of paper of constant thickness and constant density by the wet method of spinning, accompanied if desired by strands 2 of the same or another material of a different diameter, and adapted to fill interstices or occupy interior angles of the finished form of the trimming; and also accompanied if desired by strands 3 of a different characteristic. For example, the strands 3 may be wires, such as soft annealed iron wires, serving to hold the bent form of the completed molded trimming in any form composed upon it; or as shown and described in my said application Serial No. 285,640 filed June 15, 1928, concurrently herewith, certain of the longitudinally extending stuffers may be of the kind shown at 4 of Figs. 2 and 3, comprising a compressible, preferably laminated, aggregate adapted to be more easily deformed transversely by compression than are the strands 1. Whatever the nature of the strands 2, 3 and 4, it is preferred that they be of substantially uniform mass per unit of length, at least before assembly with the other strands, in order to ensure a product of accurately uniform cross section.

According to the present manufacture, a group or bundle or stuffer strands is assembled in proper relation and fed in the direction of the arrow $a$, Fig. 1. A recommended way to do this is to pull the stuffers 3 in the direction $a$ through a die or guide or grooved guide rollers, which may be of any desired shape in cross section. This will provide a taut run of the assembled stuffers, which on emergence from the die or guide or from between suitably grooved rollers, is then wrapped by a binder 5, Fig. 1, a supply of which can be carried on a rotary wrapper head, which may be of any of the kinds familiar to manufacturers of insulated wire and some kinds of cordage, so that the wrapping 5 is wrapped across and around the bundle of stuffers in closely spaced spiral turns enclosing the bundle of strands 1, 2, 3 or 4.

Suitable filamentous wrapping material for the strand 5 may vary widely; for example, as shown the strand 5 may comprise several parallel cords, threads or yarns, or contiguous and continuous fibers such as any one of the numerous artificial cellulosic strands, or spun strands of cotton, hemp, flax or jute; or relatively fine and flexible wires.

As shown in Fig. 2, I may without departure from the invention, perform the wrapping by carrying about the bundle of filler strands single binder strands 5, or groups of two or more such strands 5$a$ laid spirally about the bundle in opposite directions; for example by wrapping heads carrying supplies of the respective strands respectively running in opposite directions and applying their strands at successive places on the traveling bundle of stuffer strands.

The same steps may be resorted to, see Fig. 4, when the original form of the stuffer for the molded trimming is intended to be round as there shown, or when it is intended to be of any other shape in cross section as illustrated in Fig. 3.

In any case it is contemplated and usually required that the molded trimming after it has received the wrapping 5 shall have imposed upon it a finished shape in cross section. For example as illustrated in Fig. 1 and Fig. 5 a round bundle of stuffer strands having been wrapped, Fig. 5, may be run through rollers, trumpet guides, or dies comprised of die and roller, in such a way as to alter the cross sectional shape; as shown in Fig. 5, for example to impose upon a round bundle a half-round shape. Whenever any considerable alteration in the original molded form of the aggregate strand is desired, it is desirable and is recommended to impregnate the strand with a cementitious substance adapted to aid in retaining the molded form; for example a compound of rubber latex and any desirable filler, or a rubber cement made of about 20 per centum of rubber compound and 80 per centum of gasolene may be caused thoroughly to penetrate the wrapped strand and diluent or solvent may then be evaporated with or without the aid of heat, and the strand may then be subjected to the action of a forming die or forming rolls. As shown in Fig. 3, for example, a stuffer assembly containing one of the more readily compressible stuffers 4 may be grooved after wrapping by a roller acting transversely in the direction of the arrow $b$, Fig. 4, to compress the longitudinal stuffer 4 and deform the wrapping 5 into a groove so made.

When a trimming has been made according to the method of Fig. 1 or Fig. 2 and especially when it has been impregnated with a cementitious substance, the wrapping 5 is retained with sufficient permanence to comply with the necessities of use. But in some cases, especially when it is desirable to provide a molded core without any impregnant, and to utilize in full the possible strength of the wrapper 5, the assembled stuffer and cover may be fed in the direction of the arrow $c$, after it has been wrapped, through the instruments of a sewing machine, which may have multiple needles $n$ as shown in Fig. 6, and is preferably of the kind having loopers $r$ to retain loops of a strong sewing thread $s$, $s$ to make a row or rows of longitudinal chain stitches 10, which stitches penetrate through the stuffers, or the spaces between them, and the wrapping, extend longitudinally outside of the strands 5, and serve to hold the whole structure together in an efficient way.

I claim:

1. Molded trimming having a shaped core comprising longitudinal strands each of uniform mass per unit length, held together by a wound wrapping of a suitable binding filament.

2. Molded trimming having a shaped core comprising longitudinal strands each of uniform mass per unit length, held together by a wound wrapping of a suitable binding filament, core and binder bearing a cementitious impregnation.

3. Molded trimming having a shaped core comprising longitudinal strands each of uniform mass per unit length, held together by a wound wrapping of a suitable binding filament, at least one of said strands being more compressible than others.

4. Molded trimming having a shaped core comprising longitudinal strands including paper strands each of uniform mass per unit length, held together by a wound wrapping of a suitable binding filament.

5. Molded trimming having a shaped core comprising longitudinal paper strands each of uniform mass per unit length, held together by a wound wrapping of a suitable textile binding filament.

6. Molded trimming having a shaped core comprising longitudinal strands each of uniform mass per unit length, held together by a wound wrapping of a suitable binding filament suitably attached to the surface of the core.

7. Moldable trimming comprised of a bundle of parallel longitudinal stuffer strands of which the greater number have the characteristics of uniform mass, elongation under tensile stress and capacity for deformation under lateral pressure characteristic of paper yarns, the said bundle being fasciated by a flexible wrapping wound crosswise of its longitudinal extent.

8. Moldable trimming comprised of a bundle of parallel longitudinal stuffer strands of which the greater number have the characteristics of uniform mass, elongation under tensile stress and capacity for deformation under lateral pressure characterictic of paper yarns, the said bundle being impregnated by a cementitious adhesive and fasciated by a flexible wrapping wound crosswise of its longitudinal extent and fastened to the exterior surface of said bundle.

9. Molded trimming comprised of a bundle of parallel longitudinal stuffer strands, one or more of said strands being more readily compressible than others, said strands being surrounded by a wound wrapping, the structure having a longitudinal exterior groove along which the wrapping is depressed to conform to a compressive distortion of said compressible strand.

10. Moldable trimming comprising longitudinal stuffers and a covering comprising a binding strand wound crosswise of its length, and held in surface engaging relation by a textile strand penetrating the body of the trimming from side to side and extending longitudinally exteriorly of the wrapping from each place of penetration to another.

11. Moldable trimming comprising a longitudinally extending bundle predominantly of compressible fibrous strands, a wrapper for said bundle comprising a binding filament, said bundle being penetrated by the stitches of one or more longitudinal sewed seams of sewed stitches.

12. A strong and flexible molded trimming comprising a bundle of substantially parallel stuffer strands of hard twisted paper yarn held together in close contact by a set of flexible binder strands wound around them, and means for retaining said binding strands in position.

13. A strong and flexible molded trimming comprising a bundle of substantially parallel stuffer strands of twisted paper yarn and a wrapper comprising a flexible binding strand wound helically around the bundle of stuffer strands, and a cementitious impregnant for holding said flexible binding strand in place.

Signed by me at Boston, Massachusetts, this thirteenth day of June, 1928.

HENRY W. BUHLER.